United States Patent [19]

Dickie

[11] Patent Number: 4,773,783
[45] Date of Patent: Sep. 27, 1988

[54] COMPUTER KEYBOARD INCLUDING ATTITUDE ADJUSTING MECHANISM AND A STRIP LABEL

[75] Inventor: Robert G. Dickie, Ontario, Canada

[73] Assignee: Northern Technologies, Ltd., Markham, Canada

[21] Appl. No.: 892,198

[22] Filed: Jul. 31, 1986

Related U.S. Application Data

[63] Continuation of Ser. No. 711,933, Mar. 15, 1985, abandoned.

[51] Int. Cl.$^4$ .................................................. B41J 5/10
[52] U.S. Cl. .................................. 400/682; 400/472; 400/493; 400/681
[58] Field of Search ............... 400/472, 493, 4493.1, 400/493.2, 681, 682, 691, 711; 179/178, 179, 90 K; 40/2 R, 2 A, 10 D, 20 A, 319, 325, 330, 336, 337, 611, 626; 340/365 R, 365 VL

[56] References Cited

U.S. PATENT DOCUMENTS

| | | | |
|---|---|---|---|
| 2,797,511 | 7/1957 | Zecher | 40/611 |
| 3,208,160 | 9/1965 | Smith | 400/711 X |
| 3,941,951 | 3/1976 | Engstrom et al. | 179/179 |
| 4,092,527 | 5/1978 | Luecke | 340/365 VL X |
| 4,291,475 | 9/1981 | Schoemer | 179/179 X |
| 4,319,095 | 3/1982 | Cogan | 179/179 X |
| 4,395,591 | 7/1983 | Kaczkos | 179/178 X |
| 4,402,624 | 9/1983 | Stahl et al. | 400/472 X |
| 4,515,998 | 5/1985 | Pinede et al. | 179/179 X |
| 4,527,149 | 7/1985 | Swensen | 340/365 R |

FOREIGN PATENT DOCUMENTS

| | | | |
|---|---|---|---|
| 223245 | 9/1962 | Austria | 40/336 |
| 381443 | 9/1923 | Fed. Rep. of Germany | 400/681 |
| 133088 | 9/1951 | Sweden | 40/336 |

OTHER PUBLICATIONS

IBM Technical Disclosure Bulletin, "Dual Tilt Support Legs for Keypad", Allen, vol. 26, No. 7A, Dec. 1983, pp. 3277-3278.
IBM Technical Disclosure Bulletin, "Keyboard Tilt Mechanism", vol. 27, No. 10B, Mar. 1985, pp. 6100-6102.
IBM Technical Disclosure Bulletin, "Keyboard-Angle Adjustment", Kelley, Jr. et al, vol. 24, No. 12, May 1982, p. 6556.
IBM Technical Disclosure Bulletin, "Mechanism for Multiple Retractable Legs in an Enclosure," Thorpe, vol. 25, No. 6, Nov. 1982, pp. 2863-2864.
IBM Technical Disclosure Bulletin, "Keyboard Tilt Mechanism", Golledge, vol. 25, No. 6, Nov. 1982, pp. 2900-2901.
IBM Technical Disclosure Bulletin, "Keyboard Assembly," Greenfield et al, vol. 25, No. 8, Jan. 1983, pp. 4265-4267.

Primary Examiner—Ernest T. Wright, Jr.
Attorney, Agent, or Firm—Woodcock Washburn Kurtz Mackiewicz & Norris

[57] ABSTRACT

A keyboard has an attitude adjusting mechanism with a shaft extending lengthwise along the rear inside of the case. The shaft allows the legs to be adjusted remotely from the adjusting mechanism. Two legs are mounted on the shaft and extend through holes in the bottom rear of the case to raise and lower the rear of the case as the shaft is rotated. The adjusting mechanism is indexed by rotatable flats on the shaft which mate with complementary flats in the case to lock the mechanism in its index positions. A holder for a flexible strip label on the keyboard has a finger slot for access to the label so that it can be removed from its holder.

10 Claims, 4 Drawing Sheets

4,773,783

COMPUTER KEYBOARD INCLUDING ATTITUDE ADJUSTING MECHANISM AND A STRIP LABEL

This is a continuation of application Ser. No. 711,933, filed Mar. 15, 1985 now abandoned.

BACKGROUND OF THE INVENTION

This invention relates to keyboards and more particularly, to a computer input keyboard which has a mechanism for adjusting the attitude and a holder for a strip label which can be easily changed.

Keyboards are extensively used as data entry devices. Different users desire and need different keyboard attitudes because of differing physical characteristics and their individual predelictions. Attitude is the inclination of the keyboard from front to back. It has generally been recognized that a keyboard should slope upwardly from front to back. The degree of this slope is the attitude.

Prior art keyboard attitude adjusting mechanisms have suffered from one or more of the deficiencies of high cost and manufacturing difficulty, lack of a positive locking engagement of the mechanism once it is set, and lack of easy adjustment and user "friendliness".

Computer keyboards frequently have transparent or translucent strip labels which identify programmable function keys and luminous indicators. It is desirable that this strip label be easily inserted and removed.

It is an object of the present invention to provide a computer keyboard having an attitude adjusting mechanism and a flexible strip label holder which meets the foregoing requirements.

SUMMARY OF THE INVENTION

A keyboard has an attitude adjusting mechanism with a shaft which extends lengthwise along the rear inside of the case and two legs mounted at the extremities of the shaft. The legs each extend through holes in the bottom rear of the case to raise and lower the rear of the case as the shaft is rotated. The shaft is indexed to index positions, for example, three, which set the attitude of the keyboard. The indexing mechanism includes detents on the bottom of the case along the side of the hole through which the legs extend and flats around the hole through which the shaft and handle extend with complimentary flats on the shaft itself. By depressing the handle against the bias of a spring, these flats are disengaged and the shaft can be rotated to another flat.

The indexing provided by the handle flats is important to provide the user with a "feel" for the index positions. Reliance on the indexing provided by the leg flats does not provide a positive "feel" for the index positions because the shaft may rotate between its extremities. The indexing provided at either end by the legs engaging the detents is not a reliable indicator of index position.

The present invention has the advantage of being easily adjustable by the user, of providing a good feel to the user when adjusting the mechanism to an index position, and of being firmly locked in an index position once it is set. The adjusting mechanism is economically manufactured and easily installed in a keyboard.

Further in accordance with the invention, the keyboard has a holder for a strip label which can be easily inserted into and removed from the holder. The strip label is inserted under hold-down bars which cross the label but do not obstruct it unduly. A finger slot provides easy access to the strip label so that it can be easily removed.

The foregoing and other objects, features and advantages of the invention will be better understood from the following more detailed description and appended claims.

SHORT DESCRIPTION OF THE DRAWINGS

FIG. 1 is a perspective view of the keyboard;
FIG. 1A shows the manner in which the finger slot is used;
FIG. 1B is a section on the line 1B—1B of FIG. 1;
FIG. 2 is an exploded view of the keyboard;
FIG. 3 is a partial view of the adjusting mechanism in an index position;
FIG. 4 is similar to FIG. 3, but with the shaft depressed against the spring bias so that it can be moved to another index position;
FIG. 5 is a view on the line 5—5 of FIG. 3;
FIG. 6 is a view on the line 6—6 of FIG. 3; and
FIG. 7 shows the shaft, legs, handle and flats on the handle.

DESCRIPTION OF THE PREFERRED EMBODIMENT

Figure 1:
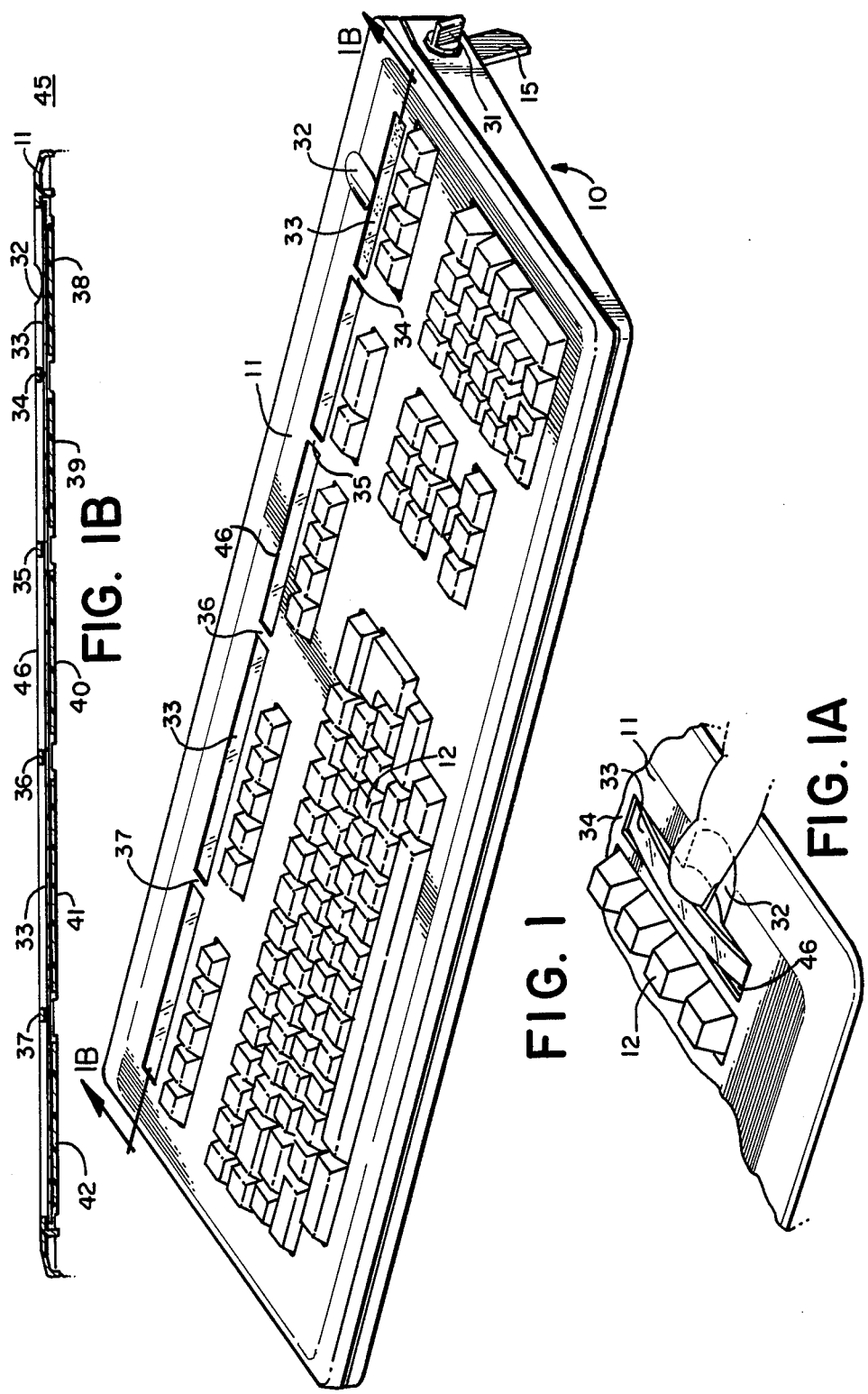
Figure 2:
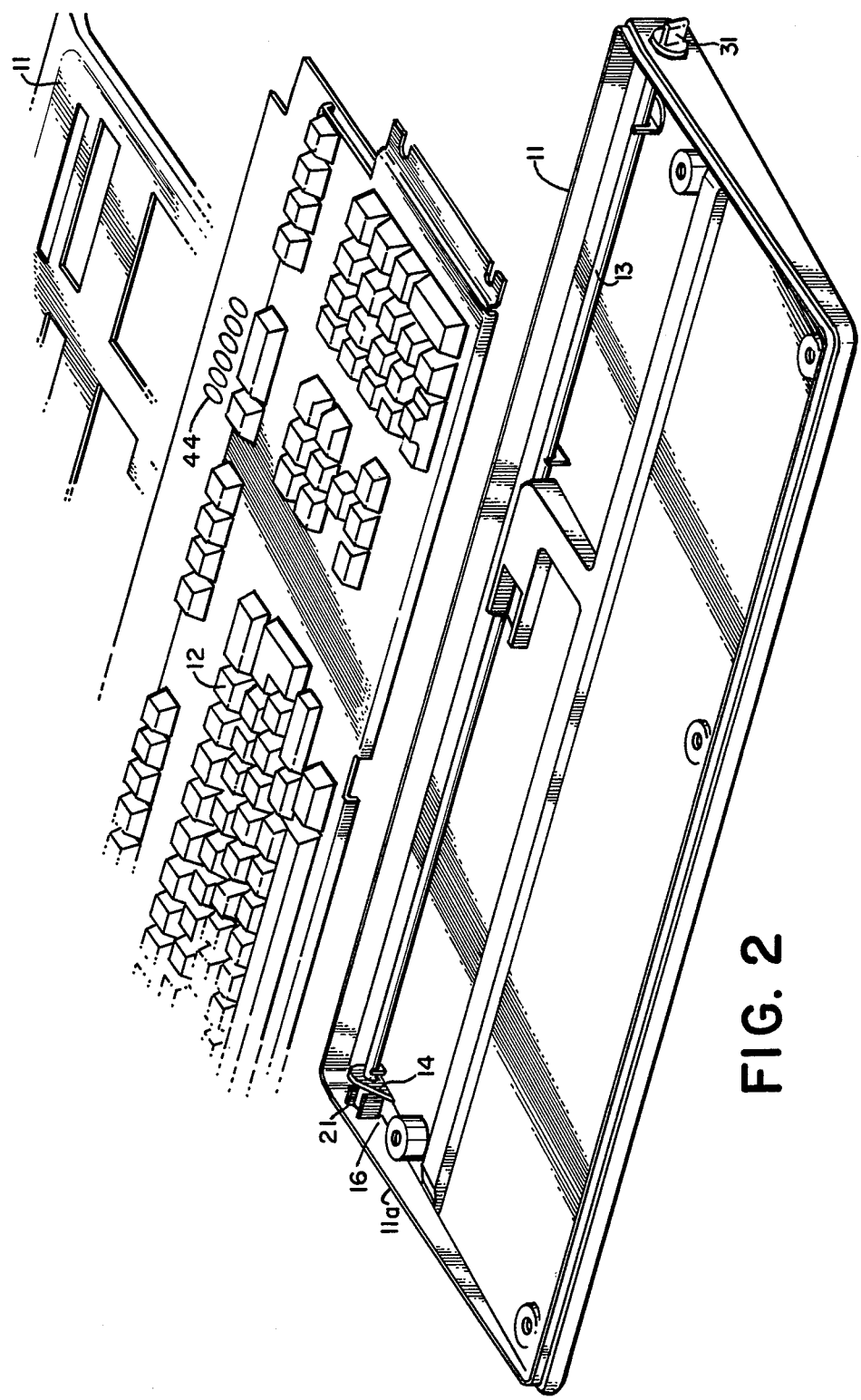
Figure 3:
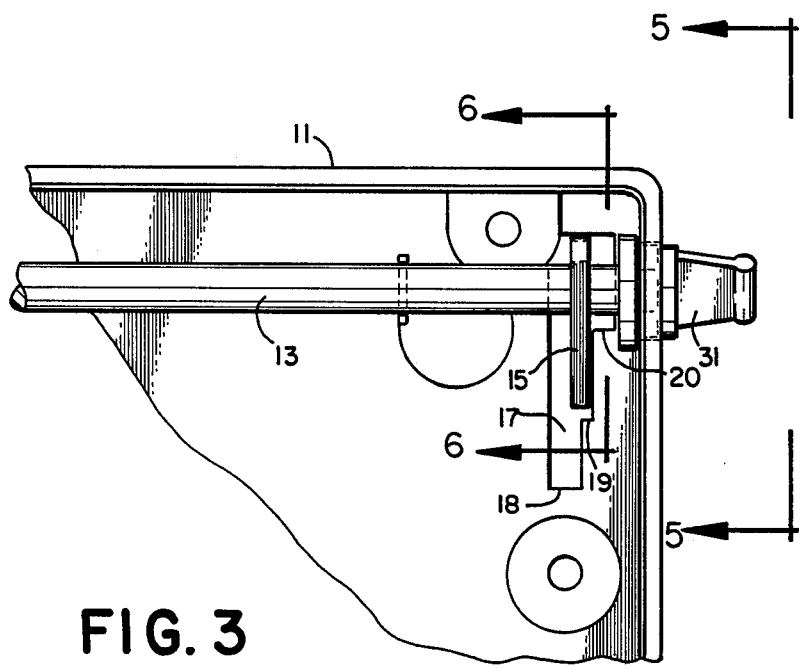
Figure 4:
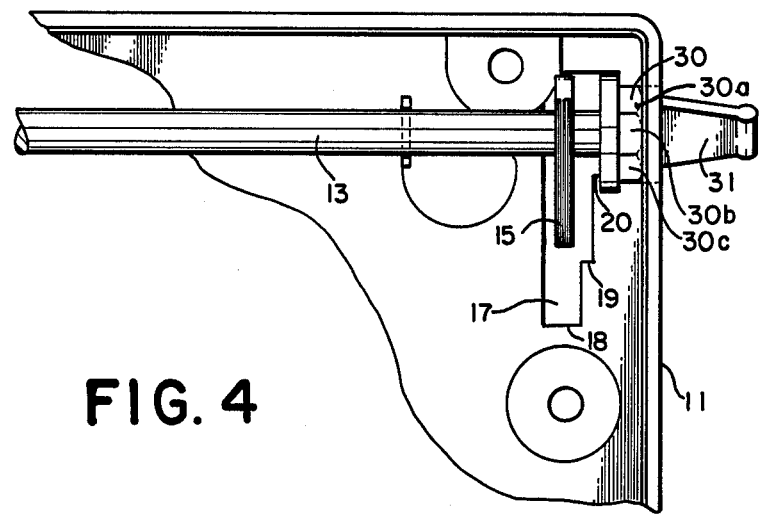
Figure 7:
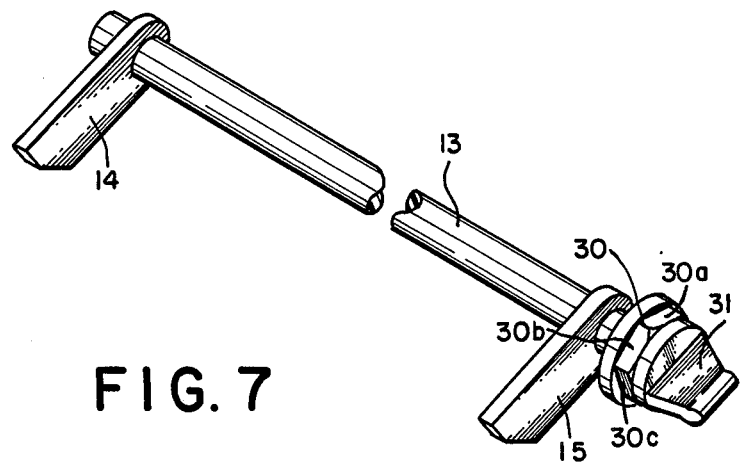

The keyboard, generally designated as 10 in FIG. 1, has a substantially rectangular case 11 and keys such as those indicated at 12 on the top surface thereof. An attitude adjusting mechanism includes a shaft 13 (FIG. 2) extending along the rear inside of the case 11 and rotatably mounted at its extremities. Legs 14 and 15 (FIG. 7) are mounted at the extremities of shaft 13 and are rotated thereby. The legs 14 and 15 respectively extend through holes 16 and 17 (FIGS. 2-4) in the bottom rear of the case 11. As the shaft 13 is rotated, the legs 14 and 15 raise and lower the rear of the case 11, thereby adjusting the attitude of the keyboard 10. Each of the holes 16 and 17 has detents such as those indicated at 18-20 along one side of hole 17. In the normal or locked position, legs 14 and 15 each bear against the side of their respective holes 16 and 17 through which they extend, as best shown in FIG. 3. As best shown in FIG. 2, a spring 21 on the shaft 13 and between the leg 14 and the edge 11a of the case 11, biases the shaft 13 toward the locked position, that is toward the knob 31, so that legs 14 and 15 bear against the detent sides of their respective holes 16 and 17.

Figure 5:
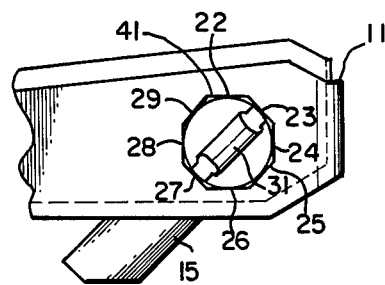
Figure 6:
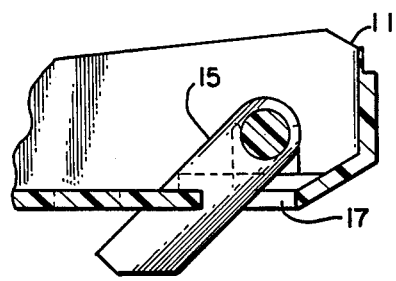

As shown in FIG. 5, the side hole 41, through which the indexing member 30 of shaft 13 extends in the normal or locked position, has flats 22-29. The indexing member 30 (FIG. 4) has a plurality of complementary flats extending around the outer periphery, flats 30a, 30b, and 30c being illustrative thereof. The complimentary flats mate with the flats 22-29 around the side hole 41 to lock the shaft 13 in the index positions. In operation, the user moves the shaft 13 against the bias of the spring 21 to the disengaged position in which the complimentary flats disengage flats 22-29, shown in FIG. 4, so that the shaft 13 can be rotated by knob 31 to another index position. Flats 22-29 provide both indexing and user detent feel.

In the exemplary embodiment shown, the attitude adjusting mechanism has three index positions, one with the legs 14 and 15 inside the case 11 and two extended outside the case. The number of index positions can be varied.

In the exemplary embodiment, the shaft 13 is molded from polycarbonate plastic, specifically Lexan ®. This plastic is tough, durable and economical for this purpose. However, it does have flexure. For this reason, the indexing provided by the detents 18–20 is added to eliminate torsional flexing, therefore, providing a stable keyboard attitude for the user. However, detents 18–20 could be eliminated with the addition of a non-flexing shaft, for example, a metal tube or bar. However, this would increase material and assembly cost.

In the exemplary embodiment shown, two legs 15 and 16 extend from the shaft 13, however, one or more legs could be used to raise or lower the rear of the keyboard 10, as well as one or more shafts with associated adjusting mechanisms.

It is also feasible for legs 14 and 15 to be adjusted via a shaft 13 having a remote adjusting mechanism, such as knob 31, for applying a linear motion to said shaft 13. In the preferred embodiment, the indexing member 30 is connected to the legs 14 and 15 remotely via a shaft 13, however, the indexing member 30 could be directly connected to a leg 14 or 15.

FIGS. 1, 1A, and 1B show the strip label 33 which has indicia (not shown) indicating the various functions performed by the keyboard 10 and computer. The strip label 33 is selectively illuminated by lights 44 (FIG. 2) under transparent portions of the label 33 to indicate performance of the functions indicated by the label 33. The strip label 33 must be easily inserted and removed from case 11. In accordance with the invention, a finger slot 32 is provided in case 11 as shown in FIG. 1A to aid in the removal of the strip label 33 from the case 11.

A holder, generally designated as 45 in FIG. 1B, is comprised of supporting sections 38–42 and hold-down bars 34–37. The supporting sections 38–42, which hold strip label 33, are under the rectangular opening 46 in the case 11. In accordance with the invention, the holder 45 includes hold-down bars 34–37 which hold the strip label 33 firmly in place without unnecessarily obstructing its view. The holder 45 of the present invention is a particularly useful feature of the keyboard 10 and adds no cost to the keyboard assembly other than the label 33 itself.

While a particular embodiment of the invention has been shown and described, various modifications are within the true spirit and scope of the invention. The appended claims are, therefore, intended to cover all such modifications.

What is claimed is:

1. A keyboard having a substantially rectangular case, keys on the top surface thereof, and an attitude adjusting mechanism comprising:
    said case having a bottom rear hole in the bottom rear thereof;
    a shaft extending lengthwise along the rear inside of said case and rotatably mounted on the case at its extremities;
    at least one leg mounted on said shaft, said leg extending through said bottom rear hole to raise and lower the rear of said case as said shaft is rotated;
    indexing means for indexing said leg to more than two index positions which set the attitude of said keyboard, said indexing means including detents in the bottom of said case along a side of said bottom rear hole for supporting said shaft against torsional flexure under the weight of said keyboard; and
    means for biasing said shaft, said shaft being movable against said biasing means to disengage said means for indexing so that said shaft can be rotated to another index position.

2. The keyboard recited in claim 1 further comprising:
    said case having a side hole in a side thereof;
    a knob on one end of said shaft extending through said side hole, and wherein said indexing means further comprises;
    flats around said side hole; and
    complementary flats connected to said knob, said complementary flats mating with the flats around said side hole to lock said leg in one of said index positions.

3. The keyboard recited in claim 2 wherein said complementary flats are on an indexing member mounted on said shaft.

4. The keyboard recited in claim 1 wherein said means for biasing comprises:
    a spring between the end of said shaft and adjacent said case to bias said shaft.

5. The keyboard recited in claim 1 wherein:
    said leg bears against at least one of said detents in the bottom of said case; and
    said means for biasing is applied to said shaft to engage said leg with said detents.

6. The keyboard recited in claim 1 wherein said shaft is plastic and is flexible.

7. A keyboard comprising:
    (a) a substantially rectangular case having;
        (i) keys on the top surface thereof; and
        (ii) a side hole in the side thereof and a first bottom rear hole and a second bottom rear hole in the bottom rear thereof, said side hole having side hole flats therearound;
    (b) a shaft extending lengthwise along the rear of said case and rotatably mounted on the case at its extremities;
    (c) a knob for rotating said shaft connected to one end of said shaft and extending through said side hole, said knob having complimentary flats connected thereto for mating with said side hole flats;
    (d) a first leg and a second leg mounted to said shaft, said first leg extending through said first bottom rear hole and said second leg extending through said second bottom rear hole, said legs being adjustable by rotation of said shaft to a plurality of index positions, said legs being lockable in said index positions upon the mating of said side hole flats with said complimentary flats; and
    (e) detents in the bottom of said case along a side of each of said bottom rear holes for engaging said legs and thereby supporting said shaft against torsional flexure under the weight of said keyboard.

8. The keyboard of claim 7 further comprising means for biasing said shaft, said shaft being movable against said biasing means from a locked position in which said complimentary flats mate with said side hole flats to a disengaged position in which said complimentary flats are disengaged from said side hole flats.

9. The keyboard of claim 7 wherein said side hole is a single side hole.

10. The keyboard of claim 7 wherein said plurality of index positions is at least three index positions.

* * * * *